(12) United States Patent
Yoeda et al.

(10) Patent No.: US 12,535,122 B2
(45) Date of Patent: Jan. 27, 2026

(54) VIBRATION DAMPER

(71) Applicant: TOYOTA JIDOSHA KABUSHIKI KAISHA, Toyota (JP)

(72) Inventors: Keiji Yoeda, Kyoto (JP); Hiroyuki Amano, Susono (JP); Shingo Okaya, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 421 days.

(21) Appl. No.: 18/179,427

(22) Filed: Mar. 7, 2023

(65) Prior Publication Data

US 2023/0304562 A1    Sep. 28, 2023

(30) Foreign Application Priority Data

Mar. 24, 2022 (JP) ................................. 2022-047917

(51) Int. Cl.
   F16F 15/31 (2006.01)
   F16F 15/315 (2006.01)
   F16F 15/02 (2006.01)

(52) U.S. Cl.
   CPC .......... *F16F 15/315* (2013.01); *F16F 15/022* (2013.01)

(58) Field of Classification Search
   CPC .................................................... F16F 15/121
   See application file for complete search history.

(56) References Cited

FOREIGN PATENT DOCUMENTS

| CN | 107387951 A | * | 11/2017 | ............... F16M 5/00 |
|---|---|---|---|---|
| CN | 110071595 B | * | 6/2020 | ............... H02K 5/24 |
| CN | 113494559 A | * | 10/2021 | ............ F16F 15/022 |
| DE | 4302242 C2 | * | 8/1995 | ............ F04C 18/107 |
| DE | 60209756 T2 | * | 11/2006 | ......... G11B 7/08511 |
| JP | H0356738 A | * | 3/1991 | |
| JP | 3608437 B2 | * | 1/2005 | |
| JP | 2012-225482 A | | 11/2012 | |

* cited by examiner

*Primary Examiner* — Melody M Burch
(74) *Attorney, Agent, or Firm* — Oblon, McClelland, Maier & Neustadt, L.L.P.

(57) ABSTRACT

A vibration damper that effectively damps vibrations moving a drive unit and a support body closer to and away from each other by a rolling mass. The vibration damper comprises: an elastic member interposed between the drive unit and the support body; an arm extending from the drive unit toward the support body; a rolling mass rolled on the arm by a reciprocation of the arm; a support member fixed to the support body while rotatably supporting the rolling mass; and a position changer that changes a contact point between the rolling mass and the arm by reciprocating the arm.

10 Claims, 11 Drawing Sheets

VIBRATION DAMPER

The present disclosure claims the benefit of Japanese Patent Application No. 2022-047917 filed on Mar. 24, 2022 with the Japanese Patent Office, the disclosure of which is incorporated herein by reference in its entirety.

BACKGROUND

Field of the Disclosure

Embodiments of the present disclosure relate to the art of a vibration damper for damping vibrations by an inertial force of a mass body, and more particularly, to a device for damping linear vibrations such as vertical vibrations by a rolling mass.

Discussion of the Related Art

Vibration dampers utilizing an inertial force are widely known in the art. For example, JP-A-2012-225482 describes a torsional vibration damper that damps torsional vibrations resulting from pulsation of an output torque of an internal combustion engine by a flywheel. In the torsional vibration reduction device described in JP-A-2012-225482, an input-side member connected to the engine and an output-side member connected to an output shaft are connected through a buffer member such as a spring damper, and a flywheel is connected to the output-side member through a centrifugal clutch. In a situation where a difference in angular accelerations between the input-side member and the output-side member is increased by the pulsations of the engine torque, a vibration damping torque is established in accordance with the difference between the angular accelerations and an inertia moment of the flywheel. Specifically, the centrifugal clutch disengages the flywheel when a rotational speed thereof increases so that a frequency band in which the vibration damping effect is ensured is automatically adjusted in accordance with the rotational speed.

As described above, the torsional vibration damper described in JP-A-2012-225482 reduces vibrations by the torque generated in accordance with a difference in the angular accelerations. Therefore, the torsional vibration damper taught by JP-A-2012-225482 may be applied only to a vibration system in which torque of a rotary member vibrates. In other words, the torsional vibration damper taught by JP-A-2012-225482 may not be used to damp vibrations of a system that vibrates vertically or horizontally such as an engine mount. The vibration of the system vibrating vertically or horizontally may be damped by an inertial body that rotates in response to a relative movement between a vibration system such as an engine mount and a support member supporting the vibration system. However, even if the inertial body is arranged in the torsional vibration damper, a reference distance between the vibration system and the support member is constant. Therefore, the inertial body and the member in contact with the inertial body to rotate the inertial body move relatively to each other only within a small range around the predetermined relative position. As a result, those members will be worn out and the inertial body will no longer be allowed to rotate smoothly. In addition, the frequency band of vibrations possible to damp the vibrations by the torsional vibration damper is limited. Thus, it is necessary to improve a vibration damping performance of the torsional vibration damper.

SUMMARY

Aspects of embodiments of the present disclosure has been conceived noting the above-explained technical problems, and it is therefore an object of the present disclosure to provide a vibration damper that effectively damps vibrations moving a drive unit and a support body closer to and away from each other by a rolling mass.

SUMMARY

According to one aspect of the present disclosure, there is provided a vibration damper that damps vibrations transmitted between a drive unit that is vibrated by generating power and a support body that supports the drive unit. In order to achieve the above-explained objective, according to the exemplary embodiment of the present disclosure, the vibration damper is provided with: an elastic member that is interposed between the drive unit and the support body moving closer to and away from each other by vibrations; an arm that extends from any one of the drive unit and the support body toward the other one of the drive unit and the support body; a rolling mass that is rolled on an outer surface of the arm by the arm reciprocated between the drive unit and the support body by the vibrations of the drive unit and the support body; a support member that is joined to the other one of the drive unit and the support body to support the rolling mass in a rotatable manner; and a position changer that changes a contact point between the rolling mass and the outer surface of the arm by reciprocating any one of the arm and the support member.

In a non-limiting embodiment, the vibration damper may further comprise an oil supplying device that supplies lubricating oil to the outer surface of the arm.

In a non-limiting embodiment, the vibration damper may further comprise a controller that controls the position changer. For example, the controller may be configured to control the position changer so as to move any one of the rolling mass and the arm between the drive unit and the support member at a predetermined rate.

In a non-limiting embodiment, the controller may also be configured to control the position changer so as to move any one of the rolling mass and the arm between the drive unit and the support member in a predetermined distance at predetermined time intervals.

In a non-limiting embodiment, the controller may also be configured to control the position changer so as to move any one of the rolling mass and the arm between the drive unit and the support member in a predetermined distance every time the drive unit is vibrated.

In a non-limiting embodiment, the position changer may be adapted to change a position of any one of the rolling mass and the arm to a position where the rolling mass and the arm are detached from each other. In addition, the controller may be further configured to control the position changer so as to move any one of the rolling mass and the arm between the drive unit and the support member to the position where the rolling mass and the arm are detached from each other, when a vibrational frequency of the drive unit is equal to or higher than a predetermined frequency.

In a non-limiting embodiment, a gravity center of the rolling mass may be offset radially outwardly from a rotational center axis of the rolling mass. In addition, the controller may be further configured to: determine a target distance between: the contact point of the rolling mass to the arm; and a position of the gravity center of the rolling mass, based on a vibrational frequency of the drive unit; and control the position changer so as to move any one of the rolling mass and the arm between the drive unit and the support member in accordance with the target distance.

In a non-limiting embodiment, the target distance may be set to a distance at which a restoring force of the elastic member and an inertial force of the rolling mass coincide with each other.

In a non-limiting embodiment, the controller may be further configured to reduce the target distance with an increase in the vibrational frequency of the drive unit.

In a non-limiting embodiment, the vibration damper may further comprise a gap sensor that measures a distance between the drive unit and the support body. In addition, the controller may be further configured to adjust a travel distance of any one of the rolling mass and the arm determined based on the target distance, based on a difference between: an actual distance between the drive unit and the body measured by the gap sensor; and a reference distance between the drive unit and the body.

In a non-limiting embodiment, the support member may be joined to the support body, and the arm may be joined to the drive unit.

In a non-limiting embodiment, a pair of the rolling masses may be arranged across the arm.

In a non-limiting embodiment, the support member may include a support arm in which one end thereof is joined to any one of the drive unit and the support body, and the other end thereof supports the rolling mass in a rotatable manner.

In a non-limiting embodiment, the position changer may be adapted to move the support arm between the drive unit and the support body.

Thus, in the vibration damper according to the exemplary embodiment of the present disclosure, the force transmitted from the drive unit to the support body moved closer to and away from each other by the vibrations is damped by the restoring force of the elastic member and the inertial force of the rolling mass rolling on the arm. In addition, the vibration damper according to the exemplary embodiment of the present disclosure is provided with the position changer for changing the contact point between the rolling mass and the outer surface of the arm by reciprocating any one of the arm and the support member. According to the exemplary embodiment of the present disclosure, therefore, a relative position between the rolling mass and the arm may be changed by the position changer. For this reason, wear of the arm and the rolling mass caused by a relative reciprocation therebetween within a contact area therebetween around a predetermined contact point therebetween may be reduced. Moreover, the rolling mass and the arm may be detached from each other thereby suppressing a vibration level when the drive unit is vibrated at a frequency band at which the vibrations propagated to the support body are increased. Further, a frequency band of the vibrations in which the vibrations propagated to the support body may be damped most effectively may be expanded.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE
PREFERRED EMBODIMENT(S)

Embodiments of the present disclosure will now be explained with reference to the accompanying drawings. Note that the embodiments shown below are merely examples of the present disclosure which should not limit a scope of the present disclosure.

Figure 1:
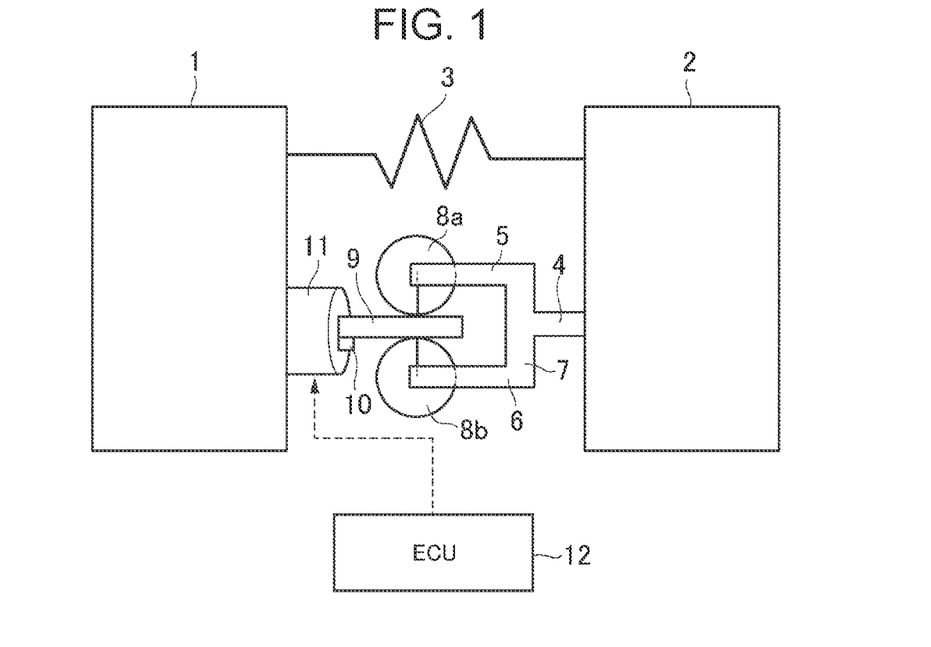
FIG. 1 is a schematic illustration showing one example of the vibration damper according to the exemplary embodiment of the present disclosure.

Turning now to FIG. 1, there is shown one example of the vibration damper according to the exemplary embodiment of the present disclosure. The vibration damper shown in FIG. 1 is adapted to damp vibrations acting between a drive unit 1 of a vehicle that is vibrated by transmitting an output power of e.g., an internal combustion engine and a support body (simply referred to as body hereinafter) 2 supporting the drive unit 1. An elastic member 3 composed mainly of a rubber or a spring for absorbing vibrations is interposed between the drive unit 1 and the body 2. The drive unit 1 and the body 2 are moved closer to and away from each other by the vibrations (i.e., in a vibrating direction). When a distance between the drive unit 1 and the body 2 is reduced shorter than a reference distance, the elastic member 3 is compressed to establish a restoring force in a direction to isolate the drive unit 1 and the body 2 away from each other. By contrast, when the distance between the drive unit 1 and the body 2 in the vibration direction is increased longer than the reference distance, the elastic member 3 is elongated to establish a restoring force in a direction to pull the drive unit 1 and the body 2 closer to each other. For example, a conventional engine mount may be employed as the elastic member 3.

In order to establish an inertial force to damp vibrations, a pair of inertial masses (i.e., rolling masses) is arranged between the drive unit 1 and the body 2. Specifically, each of the rolling masses performs translational motion while rolling. The rolling masses are held by a vibration translating mechanism that translates a force acting in a direction in which the drive unit 1 and the body 2 move closer to and away from each other into a rotary translational motion of the rolling masses.

The vibration damper shown in FIG. 1 comprises a support arm 4 extending from the body 2 toward the drive unit 1 while being fixed to the body 2 in the vibration direction, and an upper arm 5 and a lower arm 6 branching from a leading end of the support arm 4. Specifically, the leading end of the support arm 4 is connected to a longitudinal center of a branching section 7 extending perpendicularly to the vibrating direction. An upper arm 5 extends in the vibrating direction from one end of the branching section 7, and the lower arm 6 extends in the vibration direction from the other end of the branching section 7. That is, the upper arm 5 and the lower arm 6 extends parallel to each other. In the embodiment of the present disclosure, the support arm 4, the upper arm 5, and the lower arm 6 serve as a support member.

An upper rotor 8a is supported in a rotatable manner by a leading end of the upper arm 5, and a lower rotor 8b is supported in a rotatable manner by a leading end of the lower arm 6. These rotors 8a and 8b as serve as the rolling masses of the embodiments of the present disclosure. Specifically, the rotors 8a and 8b are individually formed into a disk shape having a same outer diameter, and are arranged while maintaining a predetermined clearance therebetween in a direction perpendicular to the vibrating direction.

An arm 9 is clamped by the rotors 8a, and may be reciprocated in the vibrating direction of the drive unit. The arm 9 has a circular or rectangular cross-section, and the rotors 8a and 8b are brought into contact with the outer surfaces of the arm 9. Therefore, when the arm 9 is moved back and forth in the vibrating direction integrally with the drive unit 1, the rotors 8a and 8b are rotated by the force of the arm 9 acting in the vibration direction. Thus, the rotors 8a and 8b and the arm 9 serve as the vibration translating mechanism.

For example, in order to translate the force of the arm 9 acting in the vibrating direction into a torque to rotate the rotors 8a and 8b, external teeth may be formed on the rotors 8a and 8b, and rack teeth may be formed on the outer surfaces of the arm 9. Alternatively, the outer surfaces of the rotors 8a and 8b and the outer surfaces of the arm 9 may also be formed into smooth surfaces so as to translate the force of the arm 9 acting in the vibrating direction frictionally into a torque to rotate the rotors 8a and 8b.

As described above, when the drive unit 1 and the body 2 are moved relatively in the vibration damper, a force (hereinafter, referred to as inertial force) is established in accordance with the inertia moments of the rotors 8a and 8b and the acceleration of the drive unit 1 reciprocating relatively with respect to the body 2. Specifically, when the drive unit 1 and the body 2 move closer to each other, the inertial forces of the rotors 8a and 8b act in a direction to move the body 2 closer to the drive unit 1. By contrast, when the drive unit 1 and the body 2 move away from each other, the inertial forces of the rotors 8a and 8b act in a direction to isolate the body 2 away from the drive unit 1. Whereas, when the drive unit 1 comes closer to the body 2, the elastic member 3 is compressed to establish a restoring force so that the body 2 is isolated away from the drive unit 1. By contrast, when the drive unit 1 moves away from the body 2, the elastic member 3 is expanded to establish a restoring force so that the body 2 is pulled closer to the drive unit 1. Thus, the vibration damper according to the exemplary embodiment of the present disclosure damps the vibrations propagated to the body 2 by reducing the force transmitted from the drive unit 1 to the body 2 by the balance between the inertial force acting on the body 2 and the restoring force of the elastic member 3.

Specifically, when the drive unit 1 and the body 2 are moved closer to and away from each other, a distance therebetween is increased and decreased with respect to the reference distance. Consequently, the elastic member 3 is expanded and contracted from a predetermined reference length thereof, and relative positions between the arm 9 and the rotors 8a and 8b are individually changed from reference positions. That is, the rotors 8a and 8b roll back and forth on the outer surfaces of the arm 9 only within a predetermined area. Specifically, the rotors 8a and 8b come into contact with the outer surfaces of the arm 9 only within a predetermined range. In other words, the arm 9 comes into contact with the outer circumferential surfaces of the rotors 8a and 8b only within a predetermined range. As a result, lubricating oil for reducing wear of each contact site between the outer surfaces of the arm 9 and the outer circumferential surfaces of the rotors 8a and 8b is gradually scraped out of the contact sites, and eventually the contact sites will be worn out. In FIG. 1, lines indicating centers of the reciprocation ranges of the rotors 8a and 8b on the outer surfaces of the arm 9 (i.e., reference phases) are drawn on the rotors 8a and 8b for the sake of convenience.

In order to reduce wear of the contact sites between the arm 9 and the rotors 8a and 8b, in the vibration damper according to the exemplary embodiment of the present disclosure, the lubricating oil is supplied to contact surfaces of the arm 9 and the rotors 8a and 8b, and the contact sites between the arm 9 and the rotors 8a and 8b are changeable. In the example shown in FIG. 1, an oil supplying device 10 is arranged on one end of the arm 9 closer to the drive unit 1 so as to supply the lubricating oil to the outer surfaces of the arm 9. In addition, a position changer 11 is arranged on an end surface of the drive unit 1 opposed to the body 2 to push the arm 9 toward the body 2 and to withdraw the arm 9 away from the body 2.

Figure 2:
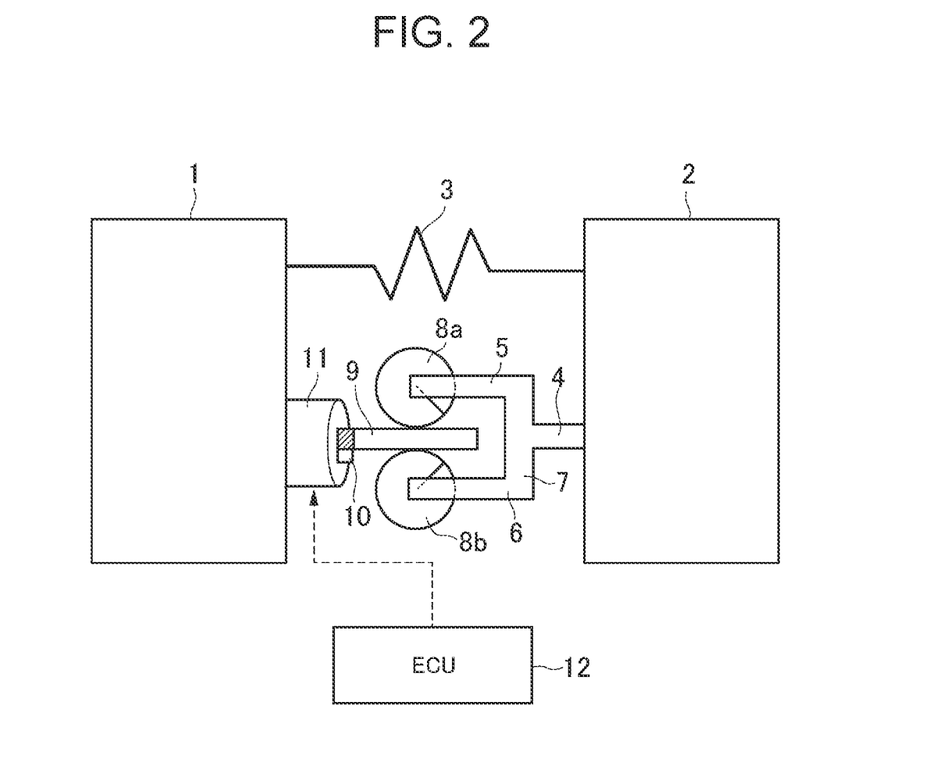
FIG. 2 is a schematic illustration showing changes in contact sites between an arm and rotors in a situation where the arm is projected.

For example, a rack-and-pinion mechanism may be employed as the position changer 11 to reciprocate the arm 9 in the vibrating direction by a power of a motor. In this case, a pinion gear is mounted on an output shaft of the motor serving as an actuator, and rack teeth are formed on the outer surfaces of the arm 9 to be engaged with the pinion gear. In this case, therefore, an amount of projection of the arm 9 in the vibrating direction may be adjusted by controlling a rotational angle of the motor. Specifically, when projecting the arm 9 toward the body 2 as illustrated in FIG. 2, the upper rotor 8a is rotated counterclockwise, and the lower rotor 8b is rotated clockwise. In this situation, when the drive unit 1 vibrates, the rotors 8a and 8b roll back and forth on the arm 9 around the positions after rotated, and the arm 9 reciprocates around the contact points to the rotated rotors 8a and 8b in the vibrating direction. In FIG. 2, the hatched area is the projecting amount of the arm 9, and the lines indicating the centers of the reciprocating ranges of the rotors 8a and 8b before the arm 9 is projected are inclined.

In order to control the position changer 11, the vibration damper is provided with an electronic control unit (hereinafter referred to as a ECU) 12 serving as a "controller" of the exemplary embodiment of the present disclosure. As the conventional electronic control units, the ECU 12 comprises a microcomputer. The ECU 12 is configured to transmit a command signal to the actuator based on incident signals from various sensors arranged in the vehicle, and formulas and maps installed in advance.

Figure 3A:
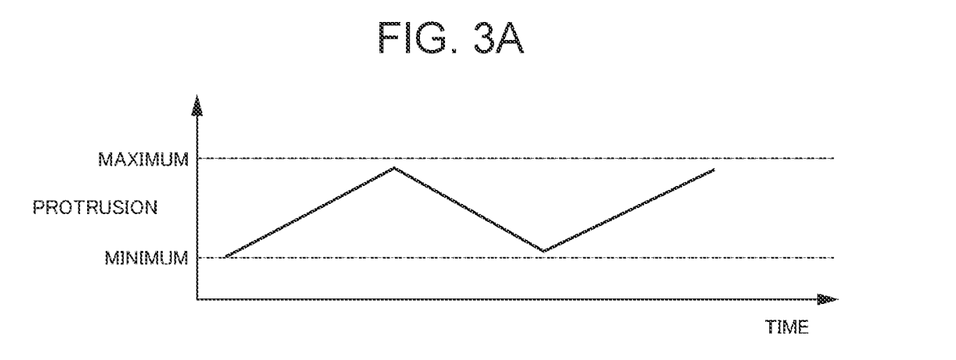
FIGS. 3A to 3C are explanatory charts showing patterns to change a projection of the arm by a position changer.
Figure 3B:
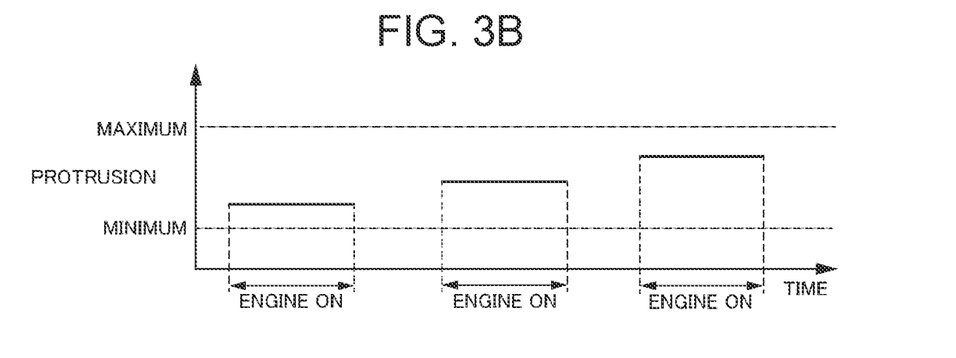
Figure 3C:
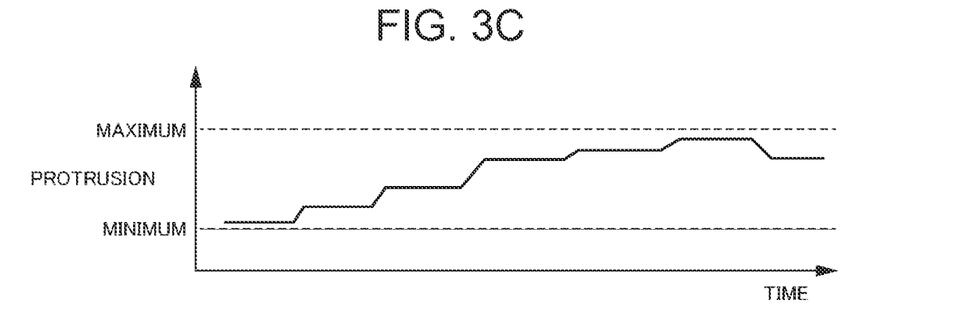

For example, as shown in FIG. 3A, the ECU 12 may be configured to transmit the command signal to the position changer 11 to project and withdraw the arm 9 continuously at a predetermined speed between the minimum value and the maximum value of the projecting amount of the arm 9. Instead, as shown in FIG. 3B, the ECU 12 may also be configured to change a projecting amount of the arm 9 between the minimum value and the maximum value stepwise in predetermined amounts every time the engine as a main factor of vibration is started. In addition, as shown in FIG. 3C, the ECU 12 may also be configured to change a projecting amount of the arm 9 between the minimum value and the maximum value stepwise in predetermined amounts at predetermined time intervals. Here, the minimum value of the projecting amount of the arm 9 is set to a value possible to maintain the contact between the arm 9 and the rotors 8a and 8b even when the arm 9 reciprocates in the vibrating direction. Whereas, the maximum value of the projecting amount of the arm 9 is set to a value at which the leading end of the arm 9 will not come into contact with the branching section 7 even when the arm 9 reciprocates in the vibrating direction.

For example, the oil supplying device 10 may be adapted to spray oil mist to the contact sites between the arm 9 and the rotors 8a and 8b. The position changer 11 may also be adapted to reciprocate the support arm 4 in the vibrating direction so as to change the reference positions of the rotors 8a and 8b between the drive unit 1 and the body 2. In addition, the rotors 8a and 8b may also be supported by the drive unit 1 instead of the body 2. In this case, the support arm 4 is joined to the drive unit 1 to support the rotors 8a and 8b, and the arm 9 is joined to the body 2 while being contacted with the rotors 8a and 8b to rotate the rotors 8a and 8b. Further, one of the rotors 8a and 8b may be omitted.

As described above, each of the contact points between the arm 9 and the rotors 8a and 8b may be changed by the position changer 11. That is, the centers of the reciprocation ranges of the rotors 8a and 8b in the rotational direction, and the centers of the contact areas on the outer surfaces of the arm 9 with the rotors 8a and 8b may be changed by the position changer 11. Therefore, wear of the contact portions of the arm 9 and the rotors 8a and 8b may be reduced. For this reason, the rotors 8a and 8b are allowed to rotate smoothly so that the level of the vibrations propagated to the body 2 will not be raised.

Figure 4:
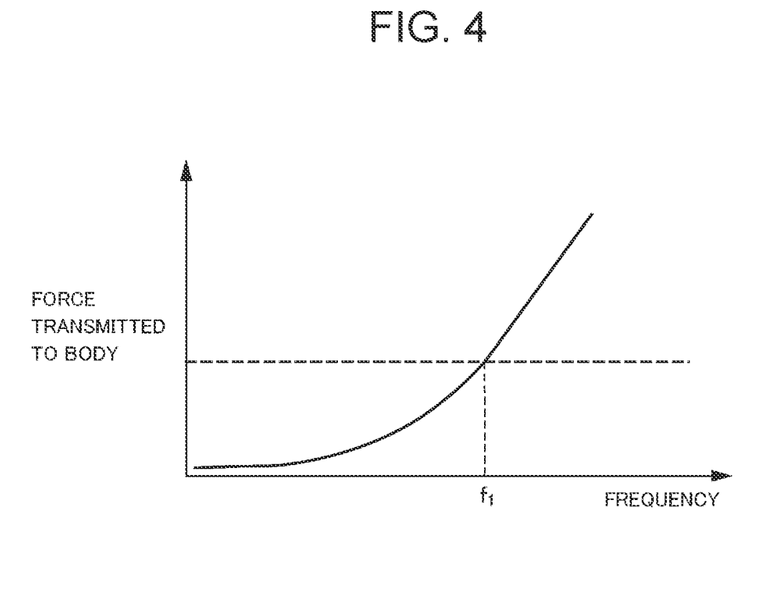
FIG. 4 is a graph showing changes in a restoring force of an elastic member and an inertial force of the rotor in accordance with a frequency of vibration of the drive unit.

As described above, in the vibration damper, the inertial forces of the rotors 8a and 8b and the restoring force of the elastic member 3 are transmitted to the body 2, and these forces act in the opposite directions. Specifically, magnitudes of the inertial forces of the rotors 8a and 8b are governed by the acceleration of the arm 9 in the vibrating direction. Therefore, as indicated by a broken line in FIG. 4, the restoring force of the elastic member 3 is constant without being affected by the frequency of vibrations. In contrast, as indicated by the solid curve in FIG. 4, the inertial force of the rotor 8a or 8b is increased with an increase in the frequency of vibrations. In the example shown in FIG. 4, specifically, a damping effect to damp a force transmitted to the body 2 is maximized at the frequency f1 where the restoring force of the elastic member 3 and the inertial force of the rotor 8a or 8b coincide with each other (hereinafter referred to as the first predetermined frequency). That is, the damping effect to damp the force transmitted to the body 2 increases gradually until the frequency increases to the first predetermined frequency f1. By contrast, the damping effect to damp the force transmitted to the body 2 decreases gradually with an increase in the frequency from the first predetermined frequency f1. Therefore, in the frequency band equal to or higher than a second predetermined frequency f2 that is higher than the first predetermined frequency f1, the vibration level propagated to the body 2 is lowered more effectively by a vibration damper without having the rotors 8a and 8b as indicated by the broken line in FIG. 5, compared to the vibration level propagated to the body 2 via the vibration damper according to the exemplary embodiment of the present disclosure as indicated by the solid line in FIG. 5.

Figure 6:
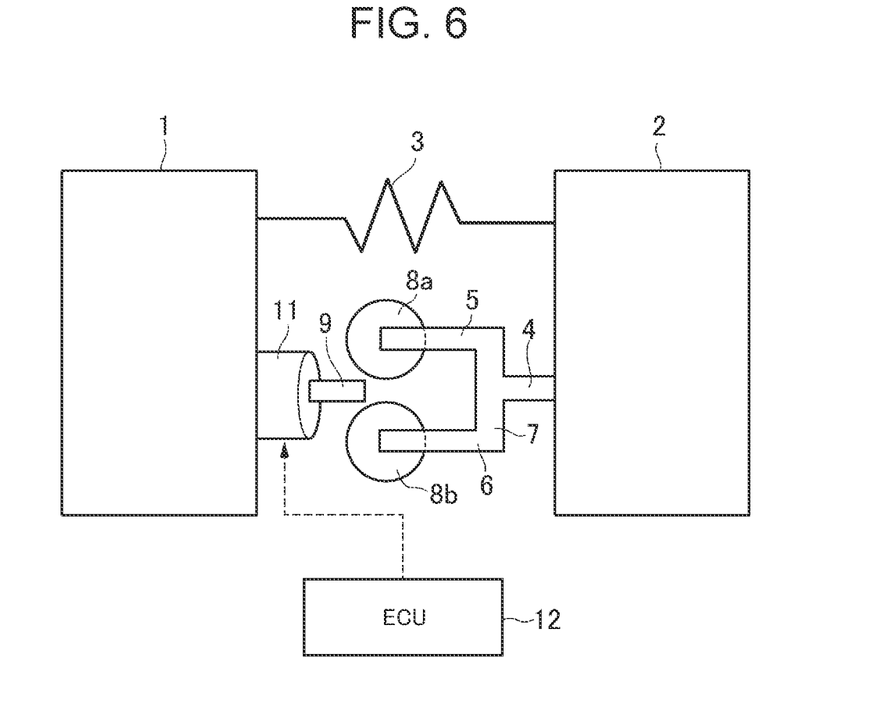
FIG. 6 is a schematic illustration showing a situation in which the arm and the rotors are not in contact with each other.

According to the exemplary embodiment of the present disclosure, therefore, the arm 9 is withdrawn from the rotors 8a and 8b by the position changer 11 as illustrated in FIG. 6 when the drive unit 1 vibrates in a frequency band equal to or higher than the second predetermined frequency f2. Consequently, the arm 9 being in contact with the rotors 8a and 8b is detached from the rotors 8a and 8b.

Figure 7:
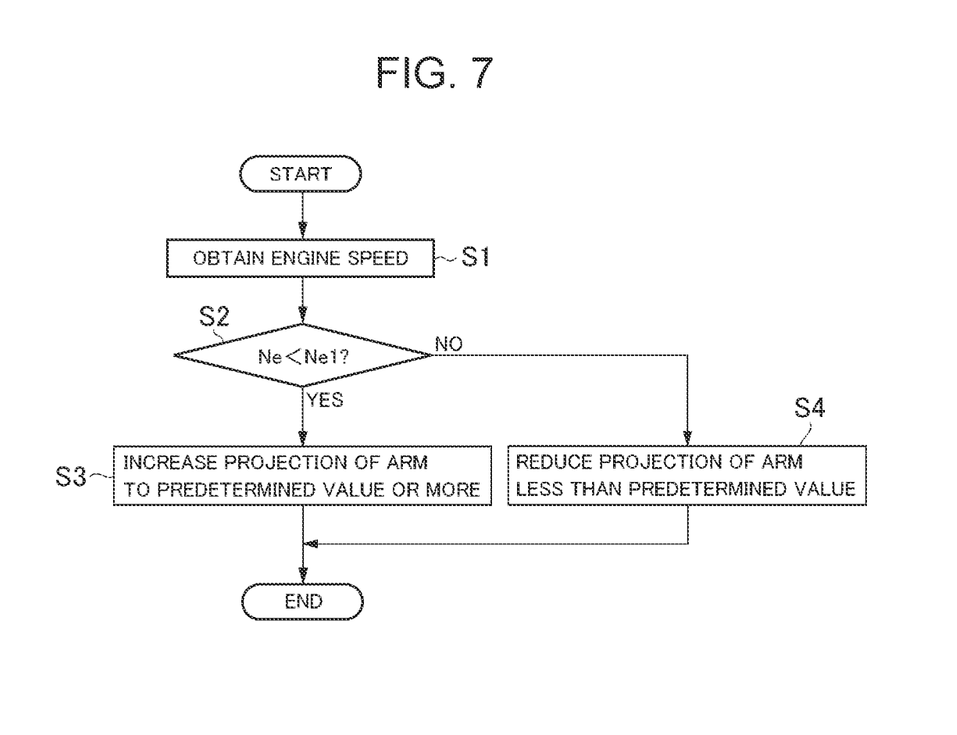
FIG. 7 is a flowchart for controlling the position changer in accordance with an engine speed.

To this end, the ECU 12 is configured to execute the routine shown in FIG. 7. At step S1, in order to obtain a frequency of the vibrations of the drive unit 1, an engine speed Ne is obtained. The main factor to vibrate the drive unit 1 is vibrations generated by combustions of the engine. Given that the engine is a four-cycle and four-cylinder engine, there are two combustion strokes per revolution. In this case, the frequency of vibration (Hz) may be converted into the engine speed (rpm) by multiplying the frequency of vibration by 30. At step S1, therefore, the engine speed Ne is obtained instead of the vibrational frequency of the drive unit 1.

Figure 5:
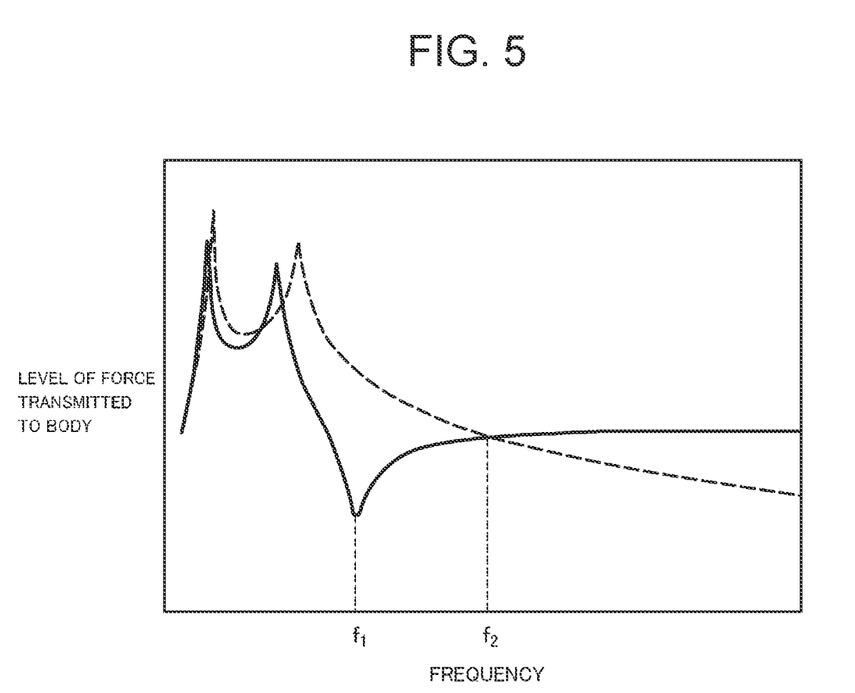
FIG. 5 is a graph indication vibration levels.

Then, at step S2, it is determined whether the engine speed Ne obtained at step S1 is lower than a first predetermined speed Ne1 at which the frequency of vibration of the drive unit 1 becomes the second predetermined frequency f2 shown in FIG. 5. To this end, the second predetermined frequency f2 at which the damping effect of the vibration damper having the rotors 8a and 8b to damp the force transmitted to the body 2 falls below that of the vibration damper without having the rotors 8a and 8b is determined in advance by calculation or experimentation. Then, the first predetermined speed Ne1 is set to a speed obtained by multiplying the second predetermined frequency f2 by 30. Accordingly, the second predetermined frequency f2 corresponds to the "predetermined frequency" of the exemplary embodiment of the present disclosure.

If the engine speed Ne is lower than the first predetermined speed Ne1 so that the answer of step S2 is YES, the vibration damping effect achieved by rolling the rotors 8a and 8b may be enhanced. In this case, therefore, the routine progresses to step S3 to project the arm 9 to a predetermined position or further, and thereafter returns. In other words, a projection of the arm 9 is increased to a predetermined amount or greater. In the situation where the arm 9 is projected to the predetermined position, the contact between the arm 9 and the rotors 8*a* and 8*b* may be maintained even if the drive unit 1 vibrates.

By contrast, if the engine speed Ne is equal to or higher than the first predetermined speed Ne1 so that the answer of step S2 is NO, the damping effect to damp the force transmitted to the body 2 by rolling the rotors 8*a* and 8*b* is reduced. In this case, therefore, the routine progresses to step S4 to withdraw the arm 9 from predetermined position, and thereafter returns. In other words, a projection of the arm 9 is reduced less than the predetermined amount. Therefore, the arm 9 and the rotors 8*a* and 8*b* will not come in contact with each other even if the drive unit 1 vibrates.

The position changer 11 may also be adapted to reciprocate the support arm 4 in the vibrating direction, that is, to reciprocate the rotors 8*a* and 8*b* between the drive unit 1 and the body 2. In addition, the rotors 8*a* and 8*b* may also be supported by the drive unit 1 instead of the body 2. In this case, specifically, the support arm 4 supporting the rotors 8*a* and 8*b* is joined to the drive unit 1, and the arm 9 is joined to the body 2 while being in contact with the rotors 8*a* and 8*b* to rotate the rotors 8*a* and 8*b*. Further, any one of the rotors 8*a* and 8*b* may be omitted.

Figure 8:
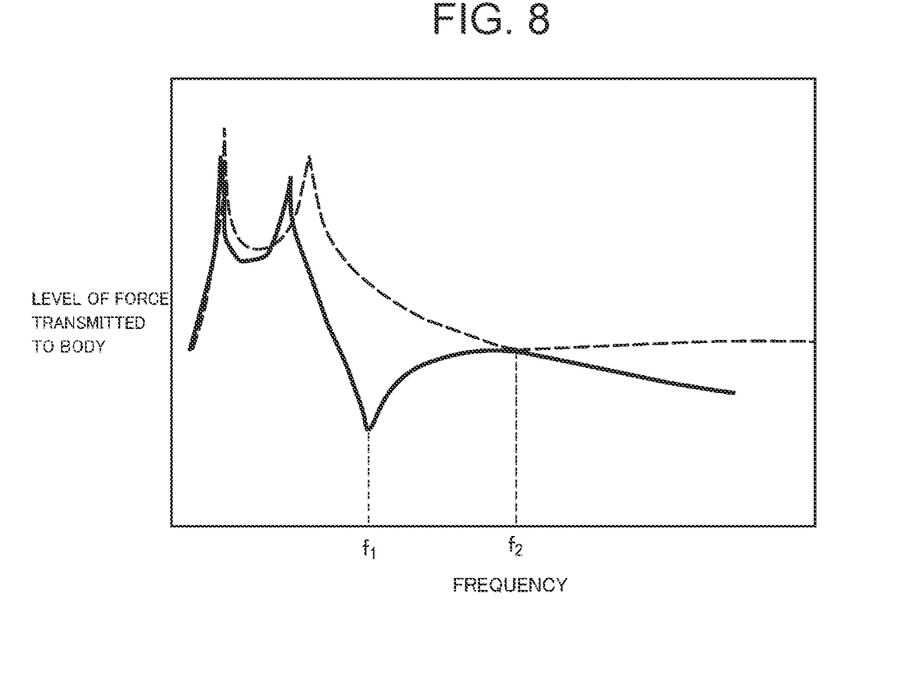
FIG. 8 is a graph indicating vibration levels in a situation where the arm and the rotors are detached from each other by the position changer.

Thus, the arm 9 is projected and withdrawn, in other words, the rotors 8*a* and 8*b* are selectively allowed to rotate in accordance with the frequency of vibration of the drive unit 1. Consequently, transmission of the inertial forces of the rotors 8*a* and 8*b* to the body 2 is interrupted in the frequency band equal to or higher than the second predetermined frequency f2. For this reason, as indicated by the solid curve in FIG. 8, the vibration level in the frequency band equal to or higher than the second predetermined frequency f2 may be suppressed lower than the vibration level of the case in which the above-explained control is not executed indicated by the dashed line in FIG. 8.

As indicated in FIG. 5, the force propagated to the body 2 may be damped most effectively by the vibration damper when the drive unit 1 vibrates at the first predetermined frequency f1, and such damping effect is reduced by a change in the frequency from the first predetermined frequency f1. That is, the frequency band in which the vibration damper can damp the force transmitted to the body 2 is limited. Therefore, the vibration damper according to the exemplary embodiment of the present disclosure is adapted to expand a frequency band in which the force transmitted to the body 2 increases.

Figure 9:
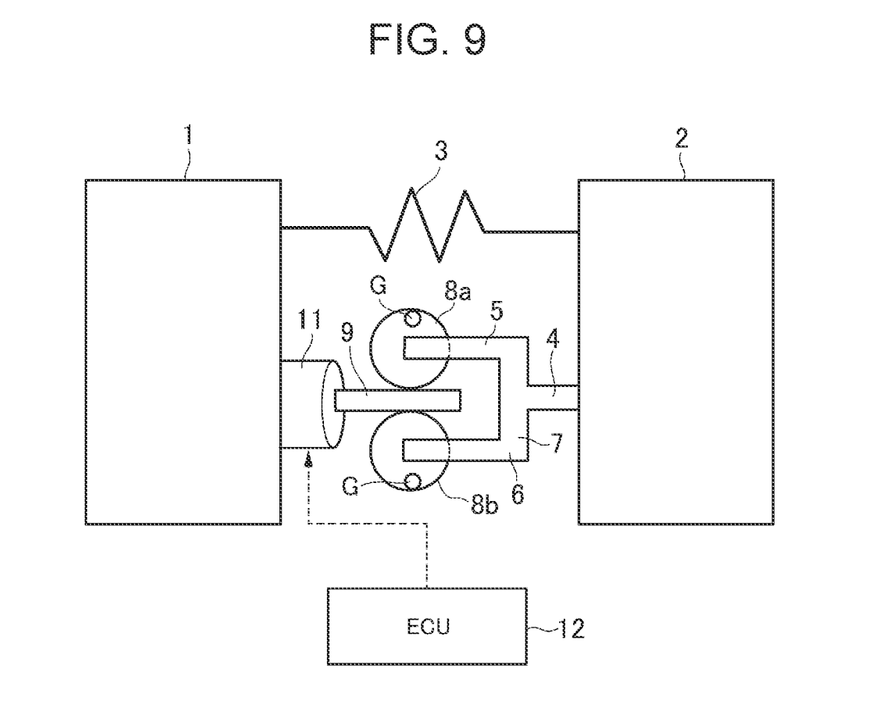
FIG. 9 is a schematic illustration showing another example of the vibration damper in which a gravity center of the rotor is offset from a rotational center.

Turning to FIG. 9, there is shown another example of the vibration damper according to the exemplary embodiment of the present disclosure. In the vibration damper shown in FIG. 9, a gravity center G of each of the rotors 8*a* and 8*b* is individually offset radially outwardly from a rotational center axis thereof.

Figure 10:
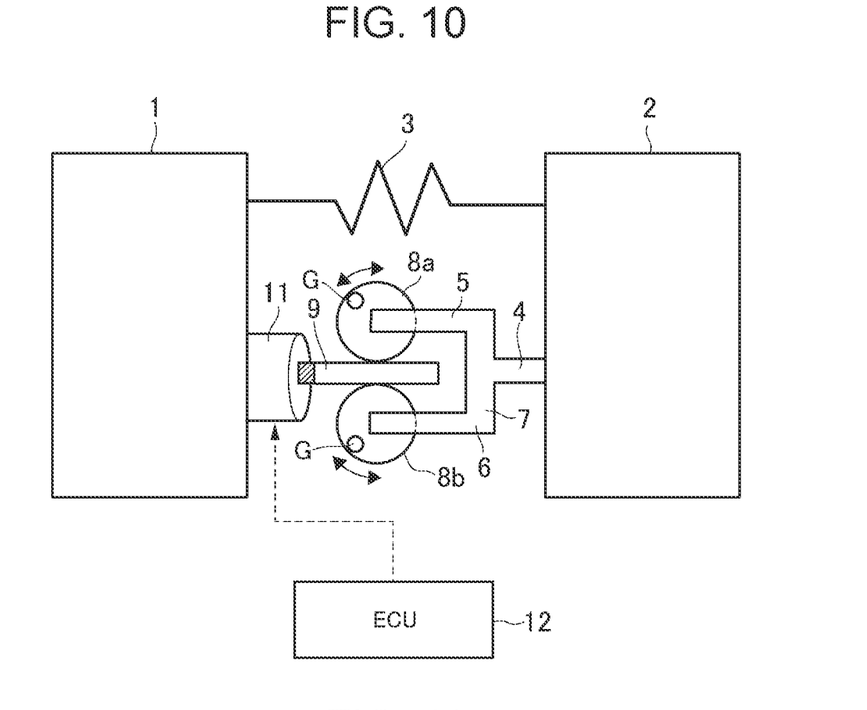
FIG. 10 is a schematic illustration showing a situation in which gravity centers of the rotors come close to the arm in the vibration damper shown in FIG. 9.

In the vibration damper shown in FIG. 9, the inertial force of e.g., the upper rotor 8*a* is increased with an increase in a distance between: the contact point between the arm 9 and the upper rotor 8*a*; and the gravity center G, and the same applies to the lower rotor 8*b*. Specifically, when the arm 9 is projected as illustrated in FIG. 10, the rotors 8*a* and 8*b* are rotated by the arm 9 so that the gravity centers G of the rotors 8*a* and 8*b* come close to the arm 9 from the farthest positions shown in FIG. 9. As a result, the inertial forces of the rotors 8*a* and 8*b* are reduced.

Figure 11:
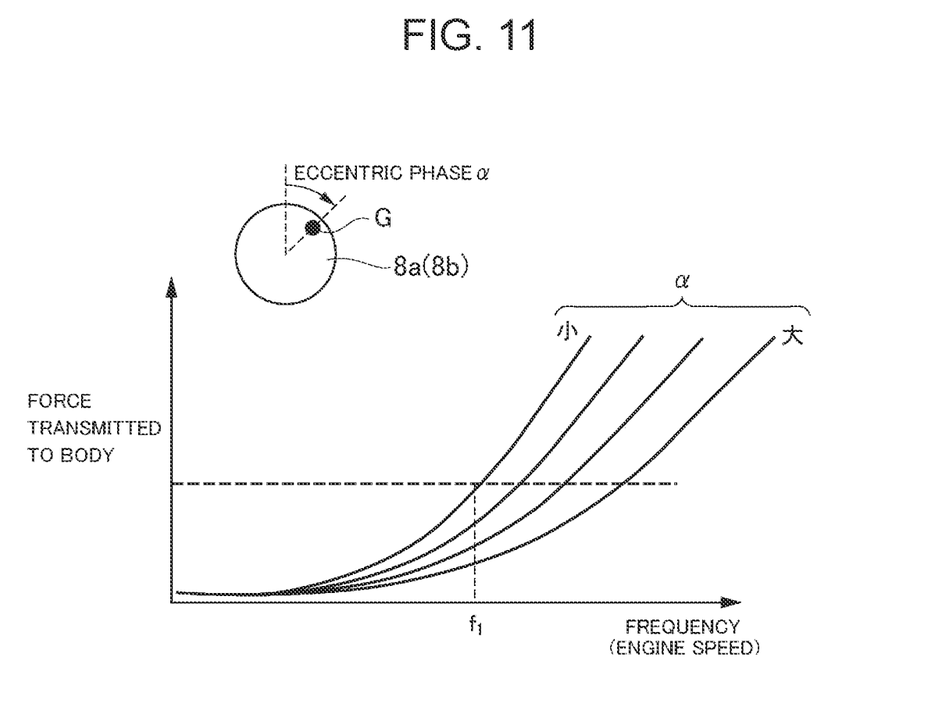
FIG. 11 is a graph showing magnitudes of force transmitted to the body according to a frequency in different phases of the gravity center of the rotor.

FIG. 11 shows a relation between: a phase α of the gravity center G with respect to the farthest position thereof from the contact point between the arm 9 and the rotor 8*a* or 8*b*; and the force transmitted to the body 2. As can be seen from FIG. 11, the force transmitted to the body 2 is increased with a reduction in the phase α. That is, by controlling the phase α of the gravity center G, it is possible to change the frequency at which the restoring force of the elastic member 3 indicated by the dashed line in FIG. 11 and the inertial force come into balance with each other so that the force transmitted to the body 2 is minimized.

To this end, the ECU 12 is further configured to control the position changer 11 such that the distance between: the contact point between the upper rotor 8*a* and the arm 9; and the gravity center G of the upper rotor 8*a*, and the distance between: the contact point between the lower rotor 8*b* and the arm 9; and the gravity center G of the lower rotor 8*b*, are individually adjusted to a target distance possible to reduce the force transmitted to the body 2, in accordance with the vibrational frequency of the drive unit 1. Specifically, the ECU 12 is further configured to execute the routine shown in FIG. 12. In the routine shown in FIG. 12, as the routine shown in FIG. 7, the engine speed Ne is obtained at step S1. Then, it is determined at step S10 whether the engine speed Ne is lower than a second predetermined speed Ne2. The second predetermined speed Ne2 is set to a level at which the vibrational frequency converges to the first predetermined frequency f1 shown in FIG. 5, and the second predetermined speed Ne2 is set lower than the first predetermined speed Net. Specifically, the second predetermined speed Ne2 may be determined based on a vibrational frequency at which the force transmitted to the body 2 is minimized in the situation where the phase α of the gravity center G of each of the rotors 8*a* and 8*b* is individually minimized so that the gravity centers G of the rotors 8*a* and 8*b* are positioned farthest from the contact points to the arm 9. To this end, such vibrational frequency is obtained in advance by calculation or experimentation.

Figure 12:
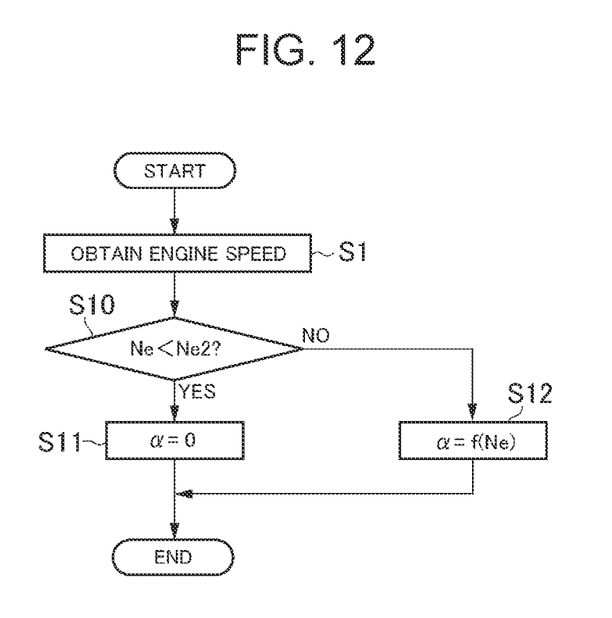
FIG. 12 is a flowchart for controlling the position changer in accordance with a vibrational frequency of the drive unit.

If the engine speed Ne is lower than the second predetermined speed Ne2 so that the answer of step S10 is YES, the routine progresses to step S11 to adjust the projecting amount of the arm 9 to "0". Consequently, the phase α of the gravity center G of each of the rotors 8*a* and 8*b* is individually minimized so that the gravity centers G of the rotors 8*a* and 8*b* are positioned farthest from the contact points to the arm 9. Thereafter, the routine returns.

By contrast, if the engine speed Ne is equal to or higher than the second predetermined speed Ne2 so that the answer of step S10 is NO, the routine progresses to step S12. At step S12, specifically, a target distance between the contact point of the rotor 8*a* (or 8*b*) to the arm 9 and a position of the gravity center G of the rotor 8*a* (or 8*b*) is determined, and a projecting amount of the arm 9 is adjusted such that the phase α of the gravity center G the rotor 8*a* (or 8*b*) is adjusted to a target phase at which the gravity center G is positioned to achieve the above-mentioned target distance. Thereafter, the routine returns.

Figure 13A:
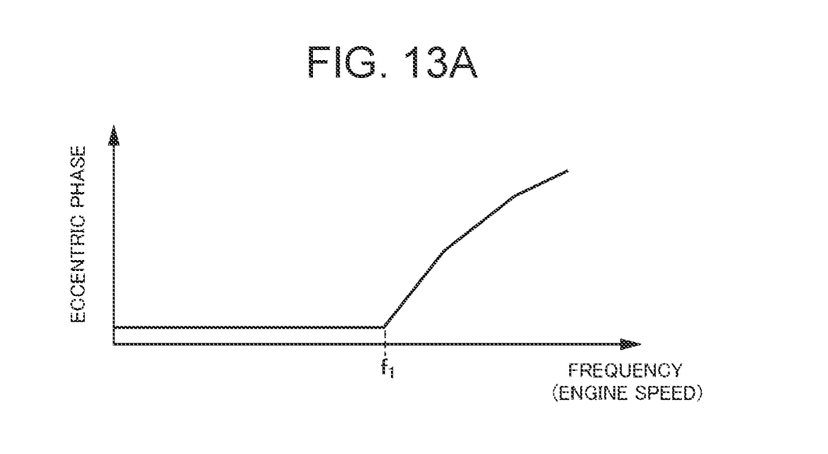
FIGS. 13A to 13C are graphs indicating a change in the phase of the gravity center of the rotor, a change in an inertial force transmitted to the body, and a change in a total force transmitted to the body, during execution of the routine shown in FIG. 12.
Figure 13B:
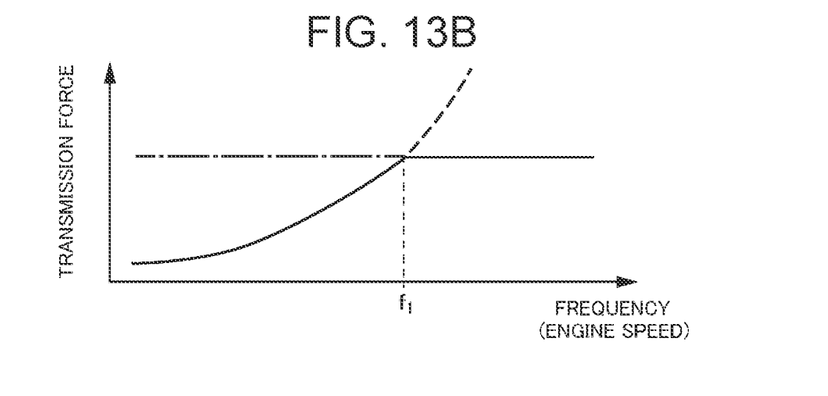
Figure 13C:
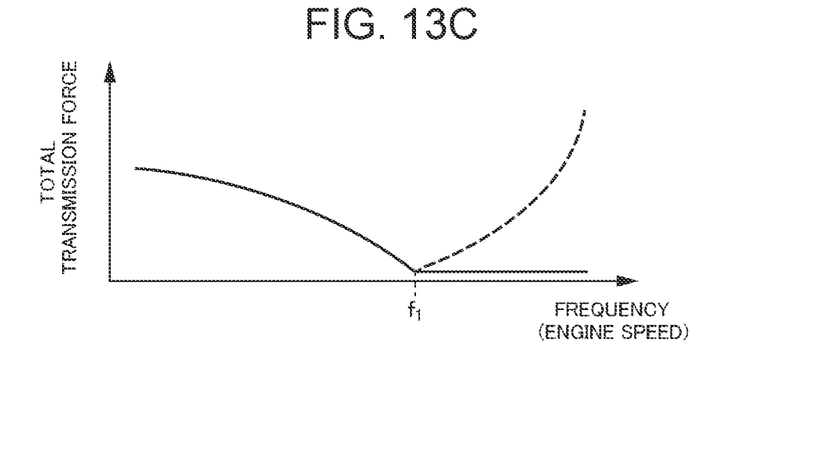

A change in the phase (i.e., an eccentric phase) a of the gravity center G of the rotor 8*a* (or 8*b*) during execution of the routine shown in FIG. 12 is shown in FIG. 13A; a change in the inertial force transmitted to the body 2 during execution of the routine shown in FIG. 12 is shown in FIG. 13B; and a change in (a total value of) the force transmitted to the body 2 during execution of the routine shown in FIG. 12 is shown in FIG. 13C. In FIG. 13A, FIG. 13B, and FIG. 13C, each horizontal axis represents the frequency of vibration of the drive unit 1 (corresponding to the engine speed).

In the frequency band of vibration of the drive unit 1 lower than the first predetermined frequency f1, step S11 of the routine shown in FIG. 12 is executed. Therefore, as indicated in FIG. 13A, the phase α of the gravity center G of the rotor 8*a* (or 8*b*) is maintained to the phase at which the gravity center G is positioned farthest from the contact point of the rotor 8a (or 8b) to the arm 9. Consequently, in the frequency band lower than the first predetermined frequency f1, the inertial force transmitted to the body 2 increases gradually as indicated in FIG. 13B with an increase in the frequency so as to come into balance with the restoring force of the elastic member 3. In this situation, therefore, the total force transmitted to the body 2 is reduced gradually as indicated in FIG. 13C, and eventually minimized at the first predetermined frequency f1.

By contrast, in the frequency band of vibration of the drive unit 1 higher than the first predetermined frequency f1, the phase α of the gravity center G of the rotor 8a (or 8b) is increased gradually with an increase in the frequency as indicated in FIG. 13A. That is, the amount of projection of the arm 9 is reduced. In this situation, therefore, the inertial force transmitted to the body 2 is maintained to a constant magnitude as indicated by the solid line in FIG. 13B, while being balanced with the restoring force of the elastic member 3. Consequently, as indicated in FIG. 13C, the total force transmitted to the body 2 is also maintained to a constant magnitude from the first predetermined frequency f1. That is, the frequency band in which the force transmitted to the body 2 is reduced most effectively is expanded. Here, it is to be noted that the magnitude of the inertial force transmitted to the body 2 and the magnitude of the total force transmitted to the body 2 in the situation where the amount of projection of the arm 9 is not changed are indicated in FIGS. 13B and 13C.

In the foregoing explanations, the direction in which the upper rotor 8a rotates clockwise corresponds to a positive value. However, in the frequency band higher than the first predetermined frequency f1, the distance between the contact point of the upper rotor 8a (or 8b) to the arm 9 and the position of the gravity center G of the upper rotor 8a (or 8b) may also be changed by projecting the arm 9 thereby rotating the upper rotor 8a (or 8b) counterclockwise.

The position changer 11 may also be adapted to reciprocate the support arm 4 in the vibrating direction, that is, to reciprocate the rotors 8a and 8b between the drive unit 1 and the body 2. In addition, any one of the rotors 8a and 8b may be omitted.

Thus, in the situation where the engine speed Ne is higher than the second predetermined speed Ne2, that is, in the situation where the frequency of the vibration of the drive unit 1 is higher than the first predetermined frequency f1, the frequency band in which the force transmitted to the body 2 is reduced may be expanded by changing the projection of the arm 9 by the position changer 11 thereby changing the phase α of the gravity center G of the rotor 8a (or 8b). In other words, when the drive unit 1 vibrates at the higher frequency than the first predetermined frequency f1, the force transmitted to the body 2 may be reduced.

In addition, the drive unit 1 is subjected to an inertial force as the vehicle is accelerated and decelerated. As a result, the distance between the drive unit 1 and the body 2 in the vibrating direction may be changed due to a change in a posture of the drive unit 1. In other words, the distance between the position where the arm 9 is joined to the drive unit 1 and the position where the support arm 4 is joined to the body 2 in the vibrating direction may be changed from the reference distance by a change in a posture of the drive unit 1. More specifically, when the vehicle is accelerated, the drive unit 1 may be inclined such that the upper section of the drive unit 1 comes close to the body 2 and that the lower section of the drive unit 1 moves away from the body 2 as indicated by the broken line in FIG. 14. In this situation, the distance between the position where the arm 9 is joined to the drive unit 1 and the position where the support arm 4 is joined to the body 2 in the vibration direction will be changed (i.e., increased in FIG. 14) from the reference distance.

Figure 14:
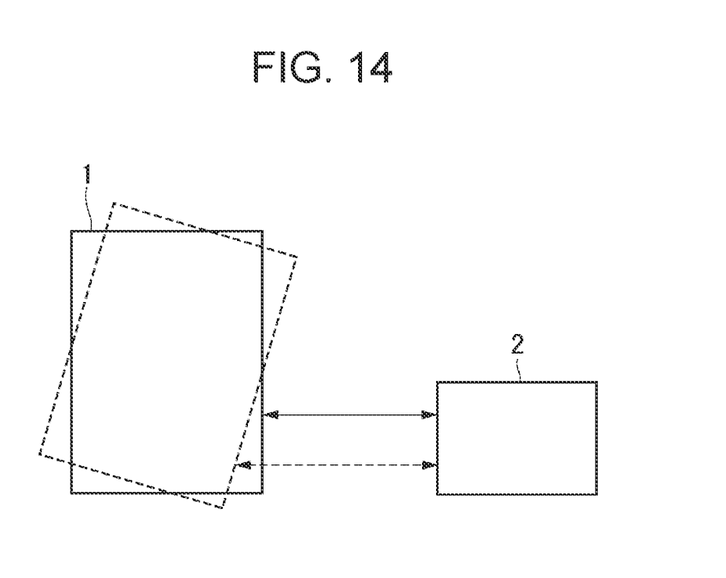
FIG. 14 is a schematic illustration showing a change in a distance between the drive unit and the body by a postural change of the drive unit caused by acceleration or deceleration of the vehicle.

Thus, the distance between the position at which the arm 9 is joined to the drive unit 1 and the position at which the support arm 4 is joined to the body 2 is changed from the reference distance by a postural change of the drive unit 1. Consequently, the relative positions between the arm 9 and the rotors 8a and 8b are changed so that the rotor 8a and 8b are rotated in accordance with amounts of change in the relative positions between the arm 9 and the rotors 8a and 8b. As a result, the phases α of the gravity centers G of the rotors 8a and 8b are changed from the reference phases. Therefore, if the arm 9 is projected and withdrawn with respect to the reference phases, the phases α of the gravity centers G of the rotors 8a and 8b may be deviated from the intended phases. In this case, the force transmitted to the body 2 may not be reduced as intended.

In order to avoid such disadvantage, in the vibration damper according to the exemplary embodiment of the present disclosure, the position changer 11 may be controlled taking into account a postural change of the drive unit 1. Specifically, in order to adjust the phases α of the gravity centers G of the rotors 8a and 8b to the phases possible to reduce the force transmitted to the body 2 in accordance with the vibrational frequency of the drive unit 1, a projecting amount of the arm 9 is adjusted based on a difference between: the actual distance between the drive unit 1 and the body 2; and the reference distance between the drive unit 1 and the body 2.

Figure 15:
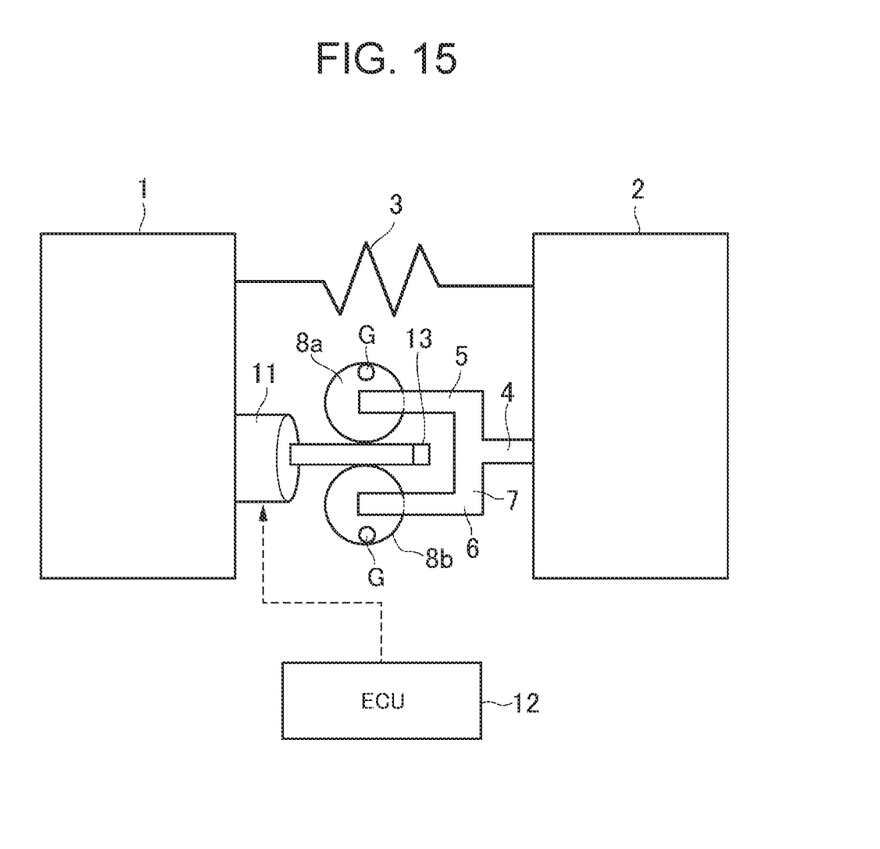
FIG. 15 is a schematic illustration showing still another example of the vibration damper in which a sensor for measuring a distance between the drive unit and the body.

Turning to FIG. 15, there is shown still another example of the vibration damper according to the exemplary embodiment of the present disclosure. In the vibration damper shown in FIG. 15, a distance between the leading end of the arm 9 and the branching section 7 (hereinafter, referred to as a gap) is measured for the purpose of measuring of the distance between the drive unit 1 and the body 2. Specifically, a gap sensor 13 is attached to the leading end of the arm 9 to measure the above-mentioned gap. In the following explanation, common reference numerals are allotted to the elements in common with those in the foregoing examples, and detailed explanation for those common elements will be omitted.

Figure 16:
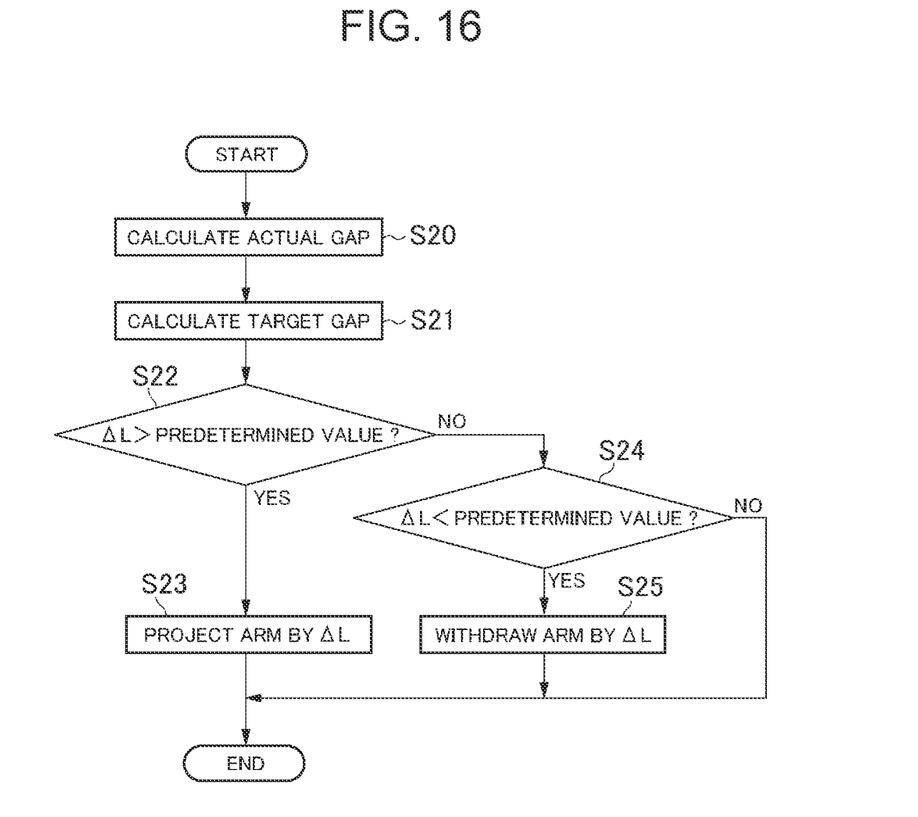
FIG. 16 is a flowchart for controlling the position changer taking account of a change in the distance between the drive unit and the body.
Figure 17A:
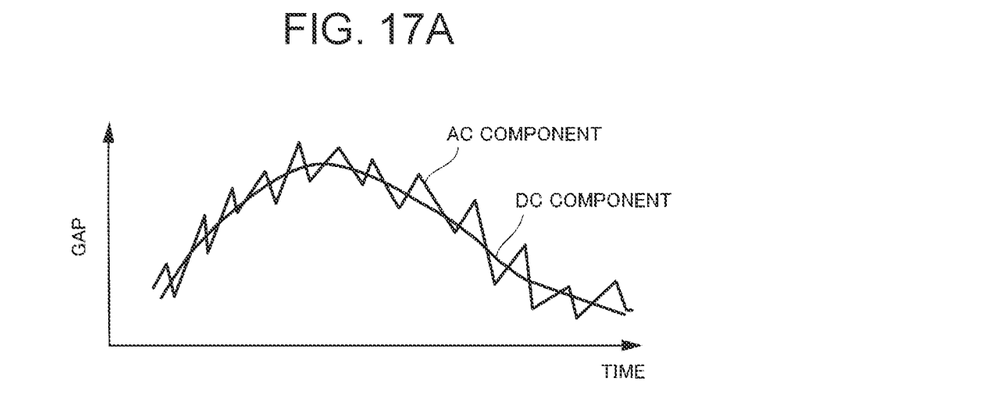
FIGS. 17A to 17C are graphs showing changes in AC component and DC component of a gap measured by a gap sensor, changes in an actual gap and a target gap, and changes in the gap during execution of the routine shown in FIG. 16.

The gap sensor 13 is connected to the ECU 12 so that the position changer 11 is controlled by the ECU 12 based on a signal transmitted from the gap sensor 13. To this end, specifically, the ECU 12 is further configured to execute a routine shown in FIG. 16. In the routine shown in FIG. 16, an actual gap (or distance) L1 which is used to determine the distance between the drive unit 1 and the body 2 after the posture of the drive unit 1 is changed is calculated at step S20. That is, the actual gap L1 does not include a change in the gap resulting from the vibration of the drive unit 1. Specifically, as indicated in FIG. 17A, the gap measured by the gap sensor 13 contains a change in the gap resulting from the vibration of the drive unit 1 (i.e., an AC component), and a change in the gap resulting from a change in the distance between the drive unit 1 and the body 2 due to a change in the posture of the drive unit 1 (i.e., a DC component). At step 20, therefore, the gap measured by the gap sensor 13 is processed by a low-pass filter thereby excluding the gap derived from the vibrational component.

Then, at step S21, a target gap L2 to achieve the phases α of the gravity centers G of the rotors 8a and 8b determined by the routine shown in FIG. 12 is calculated. Accordingly, the target gap L2 may be calculated by adding: a travel distance of the arm 9 required to achieve the phases α determined at step S12 in the routine shown in FIG. 12; to a reference gap (or distance) of a case in which the distance between the drive unit 1 and the body 2 is a predetermined distance and the phases α of the gravity center G of the rotors 8a and 8b are "0".

Thereafter, it is determined at step S22 whether a difference ΔL between the actual gap L1 obtained at step S20 and the target gap L2 obtained at step S21 is greater than a predetermined value. In other words, it is determined at step S22 whether the distance between the drive unit 1 and the body 2 is longer than a predetermined distance. To this end, the predetermined value employed at step S22 may be set to zero. Instead, the predetermined value may also be set to a value slightly larger or smaller than zero taking account of a measurement error or the like.

Figure 17B:
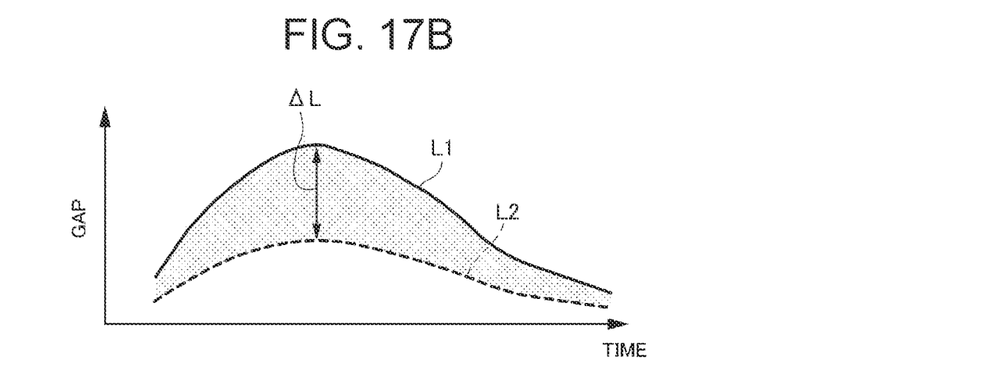

The difference ΔL between the actual gap L1 and the target gap L2 is indicated in FIG. 17B in which the solid curve represents the actual gap L1 and the dashed curve represents the target gap L2. If the difference ΔL between the actual gap L1 and the target gap L2 is greater than the predetermined value as indicated in FIG. 17B so that the answer of step S22 is YES, the routine progresses to step S23 to increase the projection of the arm 9 by an amount corresponding to the difference ΔL, and thereafter returns.

By contrast, if the actual gap L1 is equal to or less than the target gap L2 so that the answer of step S22 is NO, the routine progresses to step S24 to determine whether the difference ΔL between the actual gap L1 and the target gap L2 is smaller than a predetermined value. In other words, it is determined at step S24 whether the distance between the drive unit 1 and the body 2 is shorter than a predetermined distance. As the predetermined value employed at step S22, the predetermined value employed at step S24 may also be set to zero. Instead, the predetermined value employed at step S24 may also be set to a value slightly larger or smaller than zero taking account of a measurement error or the like.

If the difference ΔL between the actual gap L1 and the target gap L2 is smaller than the predetermined value so that the answer of step S24 is YES, the routine progresses to step S25 to reduce the projection of the arm 9 by an amount corresponding to the difference ΔL, and thereafter returns. By contrast, if the difference ΔL between the actual gap L1 and the target gap L2 is equal to or greater than the predetermined value so that the answer of step S24 is NO, this means that the distance between the drive unit 1 and the body 2 is currently maintained to the predetermined distance. In this case, therefore, the routine returns without carrying out any specific control.

As the example shown in FIG. 9, the position changer 11 may also be adapted to reciprocate the support arm 4 in the vibrating direction, that is, to reciprocate the rotors 8a and 8b between the drive unit 1 and the body 2. In addition, any one of the rotors 8a and 8b may also be omitted. Further, the gap sensor 13 may also be adapted to directly measure the distance between the drive unit 1 and the body 2 instead of measuring the distance between the leading end of the arm 9 and the branching section 7. Instead, in order to measure the distance between the drive unit 1 and the body 2, a rotational angle of the rotor 8a (or 8b) may be measured using an encoder. Furthermore, an order to execute the calculations is not limited to the foregoing order. For example, the difference between the actual gap L1 and the reference gap may also be calculated first, and position changer 11 may be adapted to adjust the projection of the arm 9 by adjusting the reference gap by the calculated difference to reduce the force transmitted to the body 2.

Figure 17C:
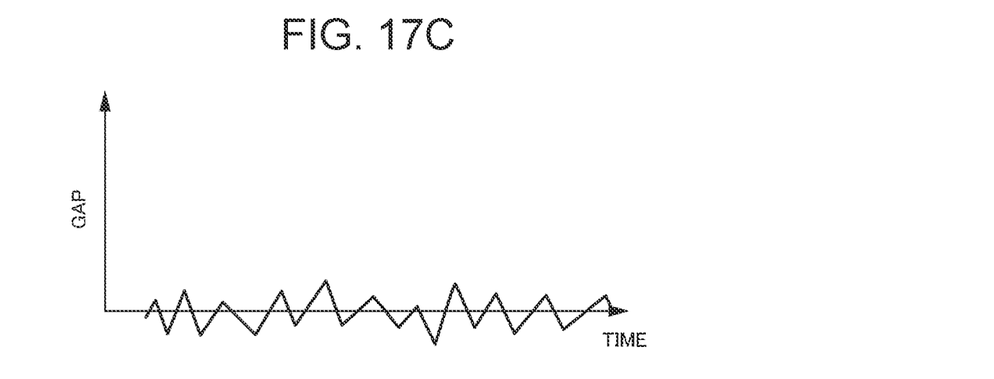

Thus, a relative distance between the drive unit 1 and the body 2 is measured by the gap sensor 13 in the situation where a posture of the drive unit 1 is changed, and the position changer 11 is controlled taking account of a change in the phase α of the gravity center G of the rotor 8a (or 8b) corresponding to the change in the relative distance between the drive unit 1 and the body 2. Therefore, the phase α of the gravity center G of the rotor 8a (or 8b) may be adjusted to the phase possible to reduce the force transmitted to the body 2. As a result, as indicated in FIG. 17C, the arm 9 is allowed to reciprocate in the vibration direction in response to the vibration of the drive unit 1 around the position possible to reduce the force transmitted to the body 2. In other words, the rotors 8a and 8b are allowed to rotate in response to the vibrations of the drive unit 1 about the phase in which the force transmitted to the body 2 can be reduced. Therefore, even when the posture of the drive unit 1 is changed as a result of accelerating or decelerating the vehicle, the force transmitted to the body 2 can be reduced.

What is claimed is:

1. A vibration damper that damps vibrations transmitted between a drive unit that is vibrated by generating power and a support body that supports the drive unit, comprising:
   an elastic member that is interposed between the drive unit and the support body moving closer to and away from each other by vibrations;
   an arm that extends from any one of the drive unit and the support body toward the other one of the drive unit and the support body;
   a rolling mass that is rolled on an outer surface of the arm by the arm reciprocated between the drive unit and the support body by the vibrations of the drive unit and the support body;
   a support member that is joined to the other one of the drive unit and the support body to support the rolling mass in a rotatable manner;
   a position changer that changes a contact point between the rolling mass and the outer surface of the arm by reciprocating any one of the arm and the support member; and
   a controller that controls the position changer,
   wherein a gravity center of the rolling mass is offset radially outwardly from a rotational center axis of the rolling mass, and
   the controller is configured to
      determine a target distance between: the contact point of the rolling mass to the arm; and a position of the gravity center of the rolling mass, based on a vibrational frequency of the drive unit, and
      control the position changer so as to move any one of the rolling mass and the arm between the drive unit and the support member in accordance with the target distance.

2. The vibration damper as claimed in claim 1, further comprising:
   an oil supplying device that supplies lubricating oil to the outer surface of the arm.

3. The vibration damper as claimed in claim 1,
   wherein the position changer is adapted to change a position of any one of the rolling mass and the arm to a position where the rolling mass and the arm are detached from each other,
   the vibration damper comprises the controller that controls the position changer, and the controller is configured to control the position changer so as to move any one of the rolling mass and the arm between the drive unit and the support member to the position where the rolling mass and the arm are detached from each other, when a vibrational frequency of the drive unit is equal to or higher than a predetermined frequency.

4. The vibration damper as claimed in claim 1, wherein the target distance is set to a distance at which a restoring force of the elastic member and an inertial force of the rolling mass coincide with each other.

5. The vibration damper as claimed in claim 1, wherein the controller is further configured to reduce the target distance with an increase in the vibrational frequency of the drive unit.

6. The vibration damper as claimed in claim 1, further comprising:
- a gap sensor that measures a distance between the drive unit and the support body, and
- the controller is further configured to adjust a travel distance of any one of the rolling mass and the arm determined based on the target distance, based on a difference between: an actual distance between the drive unit and the body measured by the gap sensor; and a reference distance between the drive unit and the body.

7. The vibration damper as claimed in claim 1,
wherein the support member is joined to the support body, and
the arm is joined to the drive unit.

8. The vibration damper as claimed in claim 1, wherein a pair of the rolling masses is arranged across the arm.

9. The vibration damper as claimed in claim 1, wherein the support member includes a support arm in which one end thereof is joined to any one of the drive unit and the support body, and the other end thereof supports the rolling mass in a rotatable manner.

10. The vibration damper as claimed in claim 9, wherein the position changer is adapted to move the support arm between the drive unit and the support body.

* * * * *